No. 870,575. PATENTED NOV. 12, 1907.
J. C. McLACHLAN.
WATER COOLING APPARATUS FOR GAS OR GASOLENE ENGINES.
APPLICATION FILED DEC. 26, 1906.
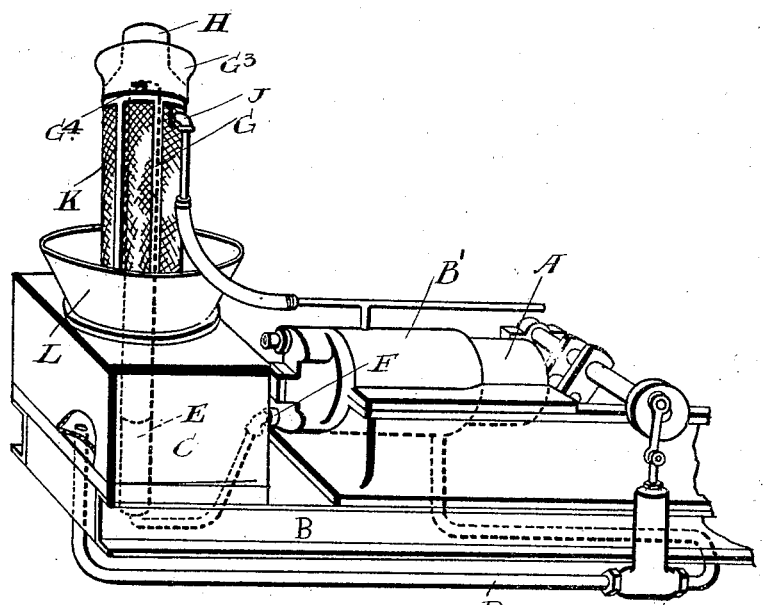
Fig. 1.
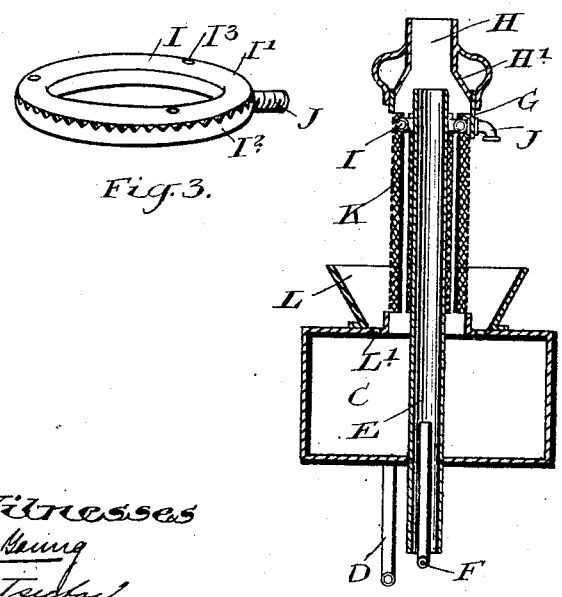
Fig. 3.
Fig. 2.
Witnesses
Inventor
J. C. McLachlan
by
Fred. B. Fetherstonhaugh
Atty.

UNITED STATES PATENT OFFICE.

JOHN CAMPBELL McLACHLAN, OF TORONTO, ONTARIO, CANADA.

WATER-COOLING APPARATUS FOR GAS OR GASOLENE ENGINES.

No. 870,575.     Specification of Letters Patent.     Patented Nov. 12, 1907.

Application filed December 26, 1906. Serial No. 349,405.

*To all whom it may concern:*

Be it known that I, JOHN CAMPBELL McLACHLAN, of the city of Toronto, in the county of York, in the Province of Ontario, Canada, have invented certain new and useful Improvements in Water-Cooling Apparatus for Gas or Gasolene Engines, of which the following is the specification.

My invention relates to improvements in water cooling apparatus for gas or gasolene engines and more particularly portable engines, and the object of the invention is to devise an apparatus whereby a small body of water may be utilized for the circulation through the water jacket of a gasolene engine and yet maintained at a comparatively cool temperature or a temperature conducive to the best results in the running of the engine and it consists essentially of a water tank suitably supported in the frame of the engine and provided at the bottom with a pipe extending to the lower portion of the water jacket, an open tube extending up through such tank and having the exhaust pipe of the engine extending into the bottom of the same, a stack extending upwardly from the water tank and provided with a perforated bottom portion, an exit at the upper end larger in diameter than the main tube from which it is separated, a tubular spraying ring perforated around its periphery and connected to the pipe leading to the highest portion of the water jacket of the engine and forming portion of the wall of the stack and surrounding the vertical tube and over which the heated water drops and cools as it passes to the tank below, the parts, being arranged and constructed in detail as hereinafter more particularly explained.

Figure 1, is a perspective view showing the arrangement of my water cooling apparatus. Fig. 2, is a vertical section through the apparatus. Fig. 3, is a detail of the spraying ring.

In the drawings like letters of reference indicate corresponding parts in each figure.

A is the cylinder of the gasolene engine provided with the usual water jacket B' and B is the frame of the engine.

C is a water tank supported on the frame at one end and D is a pipe leading from the tank to the lower portion of the water jacket or hollow base of the engine.

E is an open ended tube or exit flue leading up through the tank from the bottom and F is the exhaust pipe of the engine, which extends into the bottom of the pipe E.

G is a stack, which surrounds the pipe E. The stack G is provided with the removable cap G³ connected to the top of the stack by a suitable bayonet slot connection G⁴.

H is an exit flue of a greater diameter than the flue E and separated from it. The flue H forms portion of the cap G³ and has a tapered lower end H' into which the top of the flue E extends.

I is a hollow ring divided into upper and lower portions I' and I². The lower portion I² is connected by a pipe J extending through the stack G to the upper portion of the water jacket of the engine. The upper outer edge of the portion I² is serrated so that when the upper portion I' is secured by the bolts I³ on to the portion I², the serrations form perforations through which the water is fed onto the screens K. The screens K are secured to, and form part of the walls of the stack G.

L is a circular hopper surrounding the stack G and secured to the top of the water tank C.

L' are perforations in the top of the tank C which connect the hopper with the interior of the tank.

The operation of my invention is as follows: The circulation of hot water is preferably induced by a pump or any suitable means and when it rises in the pipe J it passes into the perforated hollow ring and is sprayed through the perforations in such ring, down over the wire screens K dropping into the tank. In its descent it is cooled by air which is drawn through the screens by the forced upward draft caused by the exhaust pipe extending into the pipe E, and passing upwardly through the exit flue H into the atmosphere. Any water which passes through the screens K is caught by the hopper L, and passes through the perforations L' into the tank C. The cooled water then returns through the pipe D to the lower portion of the water jacket.

Such an apparatus as I describe is simple and cheap to make and provides in a portable engine for the effectual cooling of the water jacket without waste of water which is an important desideratum in this class of engine.

What I claim as my invention is:

1. In a water cooling apparatus for gas or gasolene engines, the combination with the exhaust pipe of a gasolene engine, of a water tank having an open ended flue extending upwardly therethrough and into which the bottom end of the exhaust pipe extends, a stack surrounding the flue, water cooling means carried by the stack a return pipe extending from the tank to the water jacket of the engine, a flow pipe extending from the water jacket into the stack and a perforated ring located in the stack and surrounding the flue and connected to the flow pipe, as and for the purpose specified.

2. In a water cooling apparatus for gas or gasolere engines, the combination with the exhaust pipe of a gasolene engine, of a water tank having an open ended flue extending upwardly therethrough and into which the bottom end of the exhaust pipe extends, a stack surrounding the flue, a return pipe extending from the tank to the water jacket of the engine, a flow pipe extending from the water jacket into the stack, a perforated ring located in the stack and surrounding the flue and connected to the flow pipe and a wire screen located in the stack and surrounding the flue, as and for the purpose specified 3. In a water cooling apparatus for gas or gasolene engines, the combination with the exhaust pipe of a gasolene engine, of a water tank having an open ended flue extending upwardly therethrough and into which the bottom end of the exhaust pipe extends, a stack surrounding the flue, a return pipe extending from the tank to the water jacket of the engine, a flow pipe extending from the water jacket into the tank and a perforated ring located in the stack and surrounding the flue and connected to the flow pipe and screens forming a portion of the wall of the stack surrounding the flue as and for the purpose specified.

4. In a water cooling apparatus for gas or gasolene engines the combination with the exhaust pipe of a gasolene engine, of a water tank having an open ended flue extending upwardly therethrough and into which the bottom end of the exhaust pipe extends a stack surrounding the flue, a hopper surrounding the stack and provided with perforations at the bottom communicating with the tank, and a return pipe extending through the tank to the water jacket of the engine, a flow pipe extending from the water jacket into the stack, a perforated ring located in the stack and surrounding the flue and connected to the flow pipe, screens surrounding the flue and located beneath the ring, a cap for the stack provided with the exit flue extending from the flue in the stack, as and for the purpose specified.

5. In a water cooling apparatus for gas or gasolene engines, the combination with the exhaust pipe of a gasolene engine, of a water tank having an open ended flue extending upwardly therethrough and into which the bottom end of the exhaust pipe extends, a stack surrounding the flue, a return pipe extending through the tank to the water jacket of the engine, a flow pipe extending from the water jacket into the stack, a perforated ring located in the stack and surrounding the flue and connected to the flow pipe, screens surrounding the flue and located beneath the ring, a cap for the stack provided with the exit flue of greater diameter than the flue in the stack and having the lower end tapered where the flue extends thereinto as and for the purpose specified.

6. In combination, the tank connected to the water jacket of the engine, the central flue, the stack surrounding the flue and extending upwardly from the tank and open at the bottom and a water spraying means located in the stack and connected to the water jacket of the engine and the exhaust pipe leading into the vertical flue as and for the purpose specified.

7. In combination, the tank connected to the water jacket of the engine, the central flue, the stack surrounding the flue and extending upwardly from the tank and open at the bottom and a water spraying means located in the stack and connected to the water jacket of the engine, the exhaust pipe leading into the vertical flue and means for retarding the water in its descent into the tank as and for the purpose specified.

JOHN CAMPBELL McLACHLAN.

Witnesses:
B. BYD,
J. HALL.